United States Patent
Anderson et al.

(10) Patent No.: US 10,528,157 B2
(45) Date of Patent: Jan. 7, 2020

(54) DIGITAL PEN

(71) Applicant: Hewlett-Packard Development Company, L.P., Houston, TX (US)

(72) Inventors: Jon Anderson, Austin, TX (US); Jefferson Blake West, Austin, TX (US); Conan Zhang, Austin, TX (US); David Quijano, Fort Collins, CO (US)

(73) Assignee: Hewlett Packard Development Company, L.P., Spring, TX (US)

( * ) Notice: Subject to any disclaimer, the term of this patent is extended or adjusted under 35 U.S.C. 154(b) by 43 days.

(21) Appl. No.: 15/544,153

(22) PCT Filed: Jan. 30, 2015

(86) PCT No.: PCT/US2015/013806
§ 371 (c)(1),
(2) Date: Jul. 17, 2017

(87) PCT Pub. No.: WO2016/122605
PCT Pub. Date: Aug. 4, 2016

(65) Prior Publication Data
US 2018/0004316 A1 Jan. 4, 2018

(51) Int. Cl.
*G06F 3/0354* (2013.01)
*G06F 3/03* (2006.01)
*G06F 3/041* (2006.01)

(52) U.S. Cl.
CPC ........ *G06F 3/03545* (2013.01); *G06F 3/0321* (2013.01); *G06F 3/041* (2013.01)

(58) Field of Classification Search
CPC ..... G06F 3/03545; G06F 3/0321; G06F 3/041
See application file for complete search history.

(56) References Cited

U.S. PATENT DOCUMENTS

| | | | |
|---|---|---|---|
| 7,785,027 | B1 | 8/2010 | McKinley et al. |
| 8,031,177 | B2 | 10/2011 | Lapstun et al. |
| 8,226,315 | B1 | 7/2012 | McKinley et al. |
| 8,414,210 | B2 | 4/2013 | Silverbrook et al. |
| 8,482,539 | B2 | 7/2013 | Ogawa et al. |
| 2006/0139338 | A1 | 6/2006 | Robrecht et al. |
| 2008/0030486 | A1 | 2/2008 | Cook |

(Continued)

FOREIGN PATENT DOCUMENTS

| | | |
|---|---|---|
| CN | 102027437 | 4/2011 |
| KR | 10-2010-0139081 A | 12/2010 |
| KR | 20100139081 | 12/2010 |

OTHER PUBLICATIONS

Moshi Stanza Duo 2-in-1 Touchscreen Stylus and Penmodel: Stanza Duo 2-in-1 Touchscreen Stylus and Pen, 2013, pp. 1-2, MacLink Pte. Ltd.

*Primary Examiner* — Mark W Regn
(74) *Attorney, Agent, or Firm* — Brooks Cameron & Huebsch PLLC

(57) ABSTRACT

A digital pen systems and methods are provided. The digital pen comprises an internal pen module comprising a cartridge and a pressure sensor, a body housing the internal pen module, and a shuttle connected to the internal pen module on a first end of the digital pen and connected to a twist mechanism on a second end of the digital pen. The shuttle moves the cartridge and the pressure sensor when the twist mechanism is engaged.

14 Claims, 4 Drawing Sheets

(56) References Cited

U.S. PATENT DOCUMENTS

| | | | |
|---|---|---|---|
| 2009/0095543 A1* | 4/2009 | Lapstun | G06F 3/03545 |
| | | | 178/19.01 |
| 2009/0314552 A1 | 12/2009 | Underwood | |
| 2013/0308066 A1* | 11/2013 | Thomas, III | G06F 3/0321 |
| | | | 349/12 |
| 2014/0240297 A1 | 8/2014 | Park et al. | |

* cited by examiner

For each of a plurality of detectors, detecting, using the detector, at least a part of an optical pattern disposed on a display of the plurality of displays to which the detector is proximate, the part of the optical pattern corresponding to a location on a surface of the display

DIGITAL PEN

BACKGROUND

Devices such as touch screens provide an elegant, simple, and industrially "clean" design for providing capabilities of both input, e.g. touch, and output, e.g. display. A touchscreen can be formed by placing a transparent overlay proximate the display surface. Such overlays typically detect the presence and location of input, e.g. a touch, based upon a change in electrical properties of the overlay. In one example, a handheld device such as a digital pen could be used over such overlays.

BRIEF DESCRIPTION OF THE DRAWINGS

Some examples are described with respect to the following figures.

DETAILED DESCRIPTION

Figure 1A:
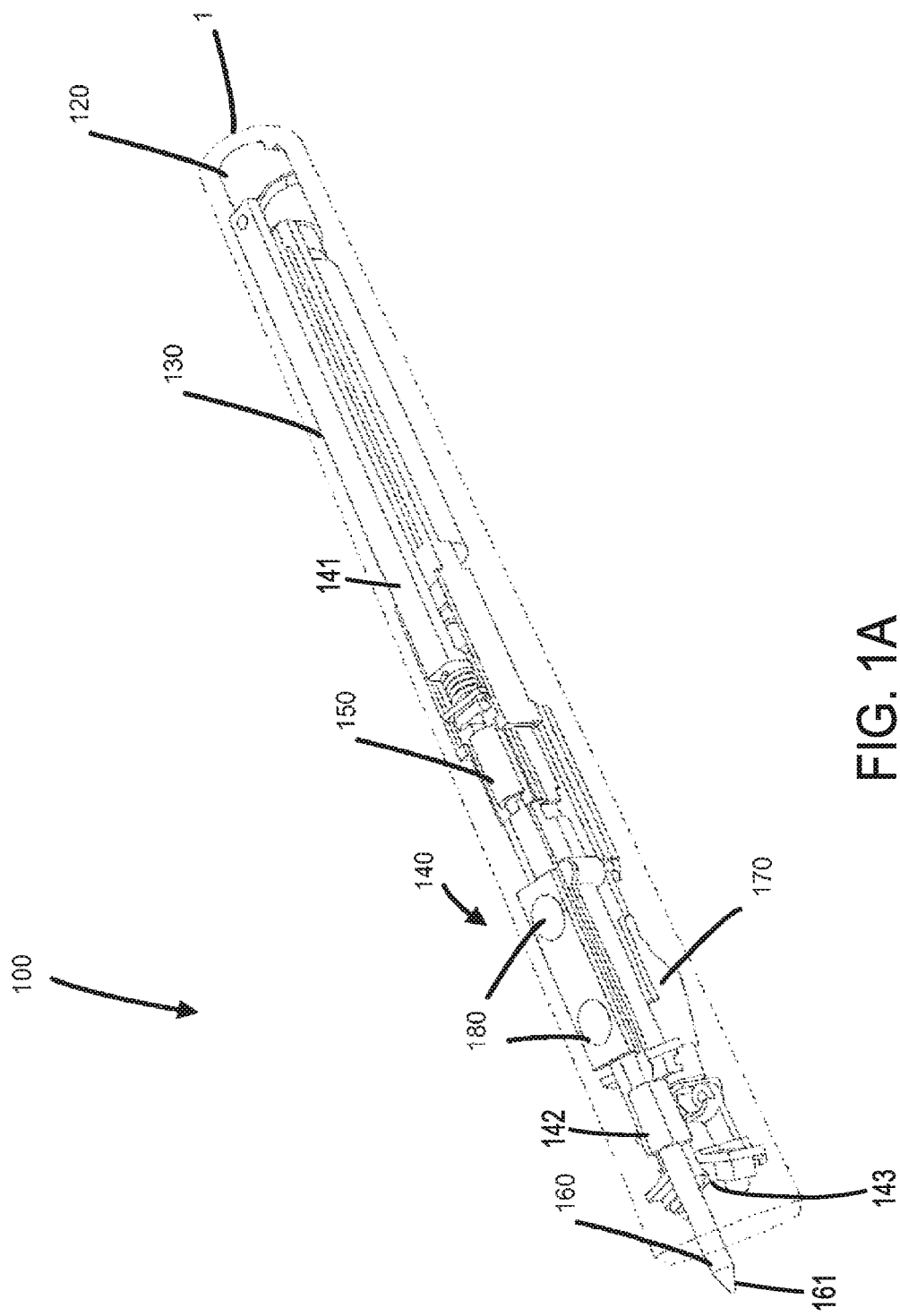
FIGS. 1A and 1B illustrate example digital pens in accordance with an implementation of the present disclosure.

Various aspects of the present disclosure are directed to a digital pen. More specifically, and as described in greater detail below, various aspects of the present disclosure are directed to a manner by which a digital pen is operated through a twisting mechanism to retract the tip of the pen to power it off and to extend the tip of the pen to power it on.

Aspects of the present disclosure described herein disclose allowing the user to use a digital pen that does not require large diameter, added length and heavier weight in order to provide the twist mechanism that retracts the tip of the pen to power it off and extends the tip of the pen to power it on. More specifically, the twist mechanism moves only specific interior components of the pen instead of all the components inside the pen. Among other things, this approach allows a more useful and desirable digital pen option for a user. The user can hold the pen more comfortably and use it for a longer period of time.

The following terminology is understood to mean the following when recited by the specification or the claims. The singular forms "a," "an," and "the" mean "one or more." The terms "including" and "having" are intended to have the same inclusive meaning as the term "comprising."

A detector, which may be part of a handheld device such as a digital stylus or digital pen, may be provided. A predetermined series of positionally-encoded elements usually in the form of dots, squares, or similar marks may be provided on a display device. One such series of elements is the unique, predetermined positionally-encoded pattern provided by Anoto Group AB (Lund, Sweden). Using the predetermined pattern, a detector can determine its location with respect to the pattern when placed proximate the pattern. The location resolution capability of the detector may, for example, be increased (1) by increasing the positional accuracy of the elements relative to each other, and/or (2) by increasing the number of dots used simultaneously to ascertain a location address, such that error is decreased in locating the dots. The detector may be a two-dimensional array detector such as a CMOS or charge-coupled device (CCD) imager. The detector may be suitably designed to be capable of high-resolution detection, such that it supports the location resolution capability of the pattern, as described above. A visibly transparent, predetermined, element pattern may be disposed in, on, or about a visibly transparent carrier. In one example, a source may generate polarized light. The source may be internal to a computing device housing the display or may be external to the computing device, for example part of the digital pen. The polarized light generated may be passed through a predetermined pattern of visibly transparent polarizing state altering elements disposed on the surface of a display device, and a change in the polarization state of the polarized light between the positionally-encoded elements and the display background may be detected by a detector. The change may correspond to a location of the detector on the display device. In some examples, the location may be determined with high resolution and accuracy. The digital pen may include a transmitter to transmit data representing the location of the detector to a computing device. In response, the computing device may cause the display device to modify its output.

Although the optical pattern is described above as comprised of polarizing elements, other types of optical patterns may also be used. For example, rather than polarizing elements, the pattern may be a pattern of near-infrared (near-IR) absorbing ink printed elements, such as dots or any other shape. In this example, the source, which is external or internal to the computing device, may generate near-IR light that is absorbed by the absorbing elements. The near-IR light need not be polarized. The near-IR light may be passed through the pattern of absorbing elements and reflected or passed to the detector. The detector may detect the pattern based on a detected contrast between regions in which absorbing elements absorbed the near-IR light, and regions in which there were no absorbing elements and therefore the near-IR light was not absorbed.

In other examples, any other optical pattern may be provided that enables detection using optical methods, using any suitable type of elements that make up the optical pattern, with or without a light source.

The above system may provide high resolution and high accuracy of touch-based input on displays, and visually transparent input systems. However, in some examples, there may be multiple displays and/or multiple digital pens present in the vicinity of the digital pen.

Accordingly, the present disclosure provides systems and methods to provide, in a multi-display system, the capability of identifying to which display a digital pen used for display interaction is proximate. The present disclosure may also provide, in a multi-digital pen system, the capability of managing inputs from the various digital pens.

As used herein, the term "light" refers to electromagnetic radiation falling within the visible spectrum, which extends from 400 nanometers (violet) to 700 nanometers (red). The term "light" may also include electromagnetic radiation falling within the near-infrared spectrum, extending from 700 nanometers to 3000 nanometers.

Figure 1B:
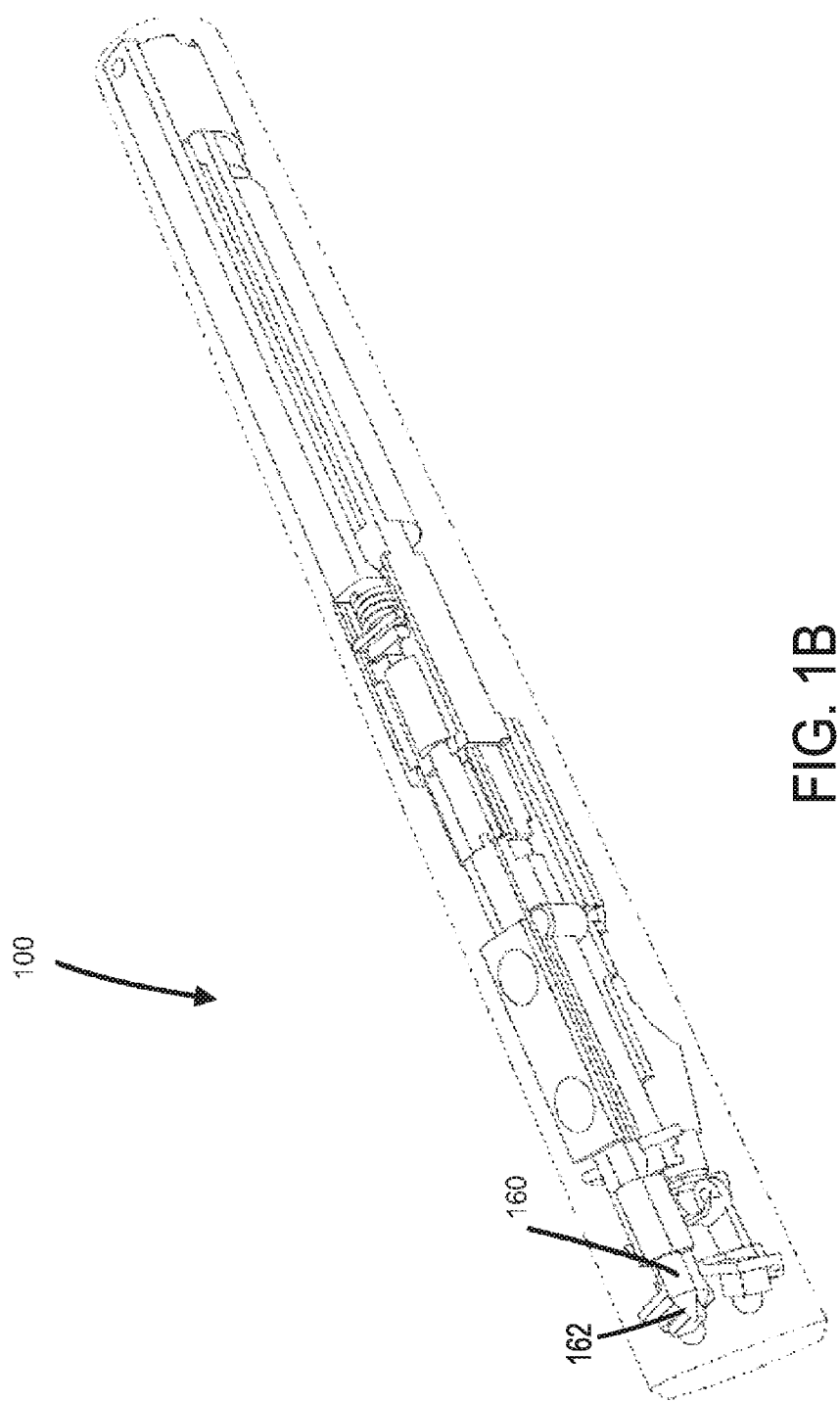

FIGS. 1A and 1B illustrate example digital pens in accordance with various implementations of the present disclosure. More specifically, FIG. 1A illustrates a digital pen 100 in a power on mode 161 with its tip extended, and FIG. 1B illustrates the digital pen 100 in a power off mode 162 with its tip retracted. It should be readily apparent that the present illustration should not be interpreted to be limited by this particular illustrative architecture shown in FIGS. 1A and 1B, and the digital pen 100 represents a generalized illustration and that other elements may be added or the illustrated elements may be removed, modified, or rearranged in many ways.

The digital pen 100 includes, but may not be limited to, a body 110 including an internal pen module 140, which contains a pressure sensor 150 and a pen cartridge 160, a twist mechanism 120, a shuttle 130, a frame 170 and buttons 180. In one implementation, the digital pen 100 includes a plastic nib (not shown in FIGS. 1A and 1B) for use on digital screens.

The body 110 of the digital pen 100 provides housing for the internal pen module 140. As mentioned above, the internal pen module 140 includes the pressure sensor 150 and the cartridge 160. The pressure sensor 150 may include a radiofrequency (RF) sensor, an acoustic sensor, a touch sensor, a magnetometer, a photosensor, or a combination thereof. Further, the internal pen module 140 may include various electronic components 141, infrared LEDs 142, and a camera 143. The twist mechanism acts as an interaction point for the digital pen 100. A user of the pen 100 may utilize the twist mechanism to extend or retract the cartridge 160 of the pen 100. The shuttle 130 is connected to the twist mechanism 120 on one end of the pen 100, and attached to the internal pen module 140 on the other end. When the twist mechanism 120 is turned, the shuttle 130 moves the pressure sensor 150 and the pen cartridge 160 in the internal pen module 140. In the example implementation shown in FIG. 1A, the shuttle 130 moves the pressure sensor 150 and the pen cartridge 160 forward, which results in extending the cartridge 160 out of the body 110 and powering the pen 100 on. In the example implementation shown in FIG. 1B, the shuttle 130 moves the pressure sensor 150 and the pen cartridge 160 backwards, which results in retracting the cartridge 160 into the body 110 and powering the pen 100 off. It should be noted that the shuttle 130 does not move any components other than the pressure sensor 150 and the pen cartridge 160 and accordingly does not require any changes in the optimal diameter, weight or length of the digital pen 100.

In one implementation, the buttons 180 are positioned on the frame 170. The buttons 180 may be programmed to act as controllers, such as mouse click, and may be set to default settings or programmed based on user preferences.

Figure 2:
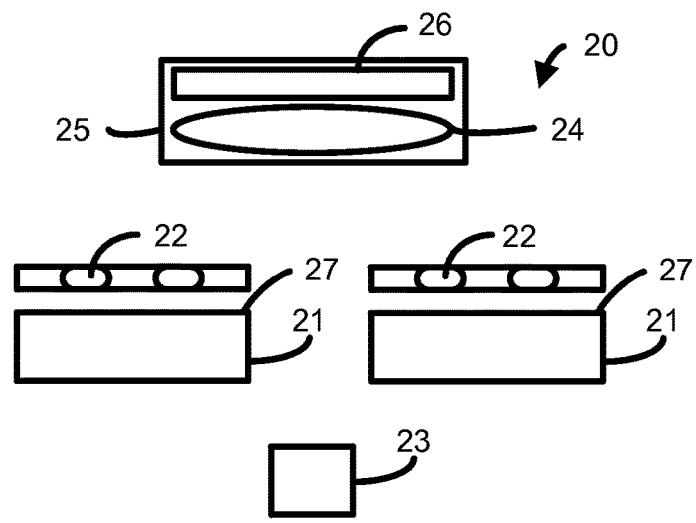
FIG. 2 illustrates schematic representations of an example digital pen in accordance with an implementation of the present disclosure.

FIG. 2 is a block diagram illustrating a positional input system 20 according to some examples. The system 20 may include a plurality of displays 21. Each of the displays 21 may have disposed thereon a respective predetermined optical pattern 22. The system 20 may include a processor 23 to determine to which a display of a plurality of displays 21 a detector 24 is proximate. Although the processor 23 is shown external to other elements in the system 20, the processor 23 may be located in any of the devices in the system 200. The system 20 may include a digital pen 25 having the detector 24 and a transmitter 26. The detector 24 may be to detect a part of the predetermined pattern disposed on the display 21 to which the detector 24 is proximate. The part of the predetermined pattern may correspond to a location on a surface 27 of the display 21. The transmitter 26 may be to transmit data representing the location of the digital pen to a computing device communicatively coupled to the digital pen 25.

Figure 3:
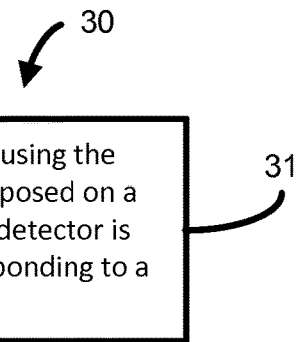
FIGS. 3 and 4 illustrate an example process flow diagram in accordance with an implementation.

FIG. 3 is a flow diagram illustrating a positional input method 30 according to some examples. The method may be performed in a system comprising a plurality of displays each having disposed thereon a respective optical pattern. At 31, for each of a plurality of detectors, at least a part of an optical pattern disposed on a display of the plurality of displays to which the detector is proximate may be detected using the detector. The part of the optical pattern may correspond to a location on a surface of the display.

Figure 4:
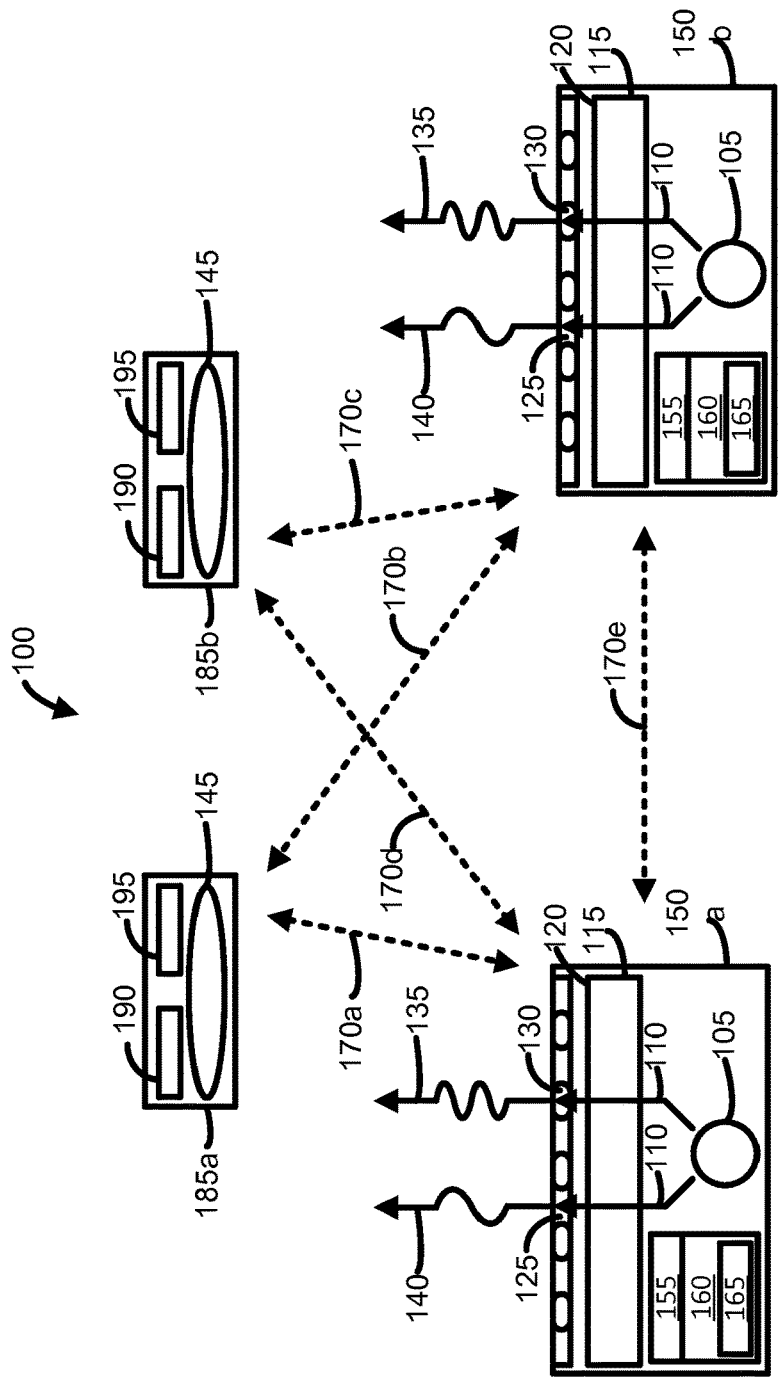

FIG. 4 is a block diagram illustrating a positional input system 100 according to some examples. The system 100 may include a computing devices 150a-b and digital pens 185a-b. Each of the digital pens 185a-b has a detector 145 and a controller 190. Each digital pen 185a-b may be a stylus, cell phone, smartphone, remote controller, pen, or any other suitable digital pen. The digital pens 185a-b may be different types of the devices relative to one another. Although the following description will specifically describe operation of the computing device 150a and digital pen 185a, the computing device 150b is similar to the computing device 150a, and the digital pen 185b is similar to the digital pen 185a.

The computing device 150a may be a tablet, laptop, smartphone, desktop, television, or any other type of computing device. The computing device 150a may include a processor 155 for executing instructions such as those described in the methods herein. The processor 155 may, for example, be a microprocessor, a microcontroller, a programmable gate array, an application specific integrated circuit (ASIC), a computer processor, or the like. The processor 155 may, for example, include multiple cores on a chip, multiple cores across multiple chips, multiple cores across multiple devices, or combinations thereof. In some examples, the processor 155 may include at least one integrated circuit (IC), other control logic, other electronic circuits, or combinations thereof.

The processor 155 may be in communication with a computer-readable storage medium 160 via a communication bus. The computer-readable storage medium 160 may include a single medium or multiple media. For example, the computer readable storage medium 160 may include one or both of a memory of the ASIC, and a separate memory in the computing device 150a. The computer readable storage medium 160 may be any electronic, magnetic, optical, or other physical storage device. For example, the computer-readable storage medium 160 may be, for example, random access memory (RAM), static memory, read only memory, an electrically erasable programmable read-only memory (EEPROM), a hard drive, an optical drive, a storage drive, a CD, a DVD, and the like. The computer-readable storage medium 160 may be non-transitory. The computer-readable storage medium 160 may store, encode, or carry computer executable instructions 165 that, when executed by the processor 155, may cause the processor 155 to perform steps of any of the methods or operations disclosed herein according to various examples.

The computing device 150a may include a display device including a display 115 which may have a surface 120. The display 115 may be communicatively coupled to the processor 155 and computer-readable medium 160 via the communication bus.

The controller 190 may include a processor and computer-readable medium similar to processor 155 and computer-readable medium 160 so as to perform certain steps of the methods disclosed herein.

The computing device 155 may include a polarized light source 105 providing light having a polarization state 110. The polarized light source 105 may be within or proximate to the display 115. A carrier 125 having a predetermined pattern, e.g. an optical pattern, of visibly transparent polarization altering elements 130 may be disposed proximate the surface 120 to change or otherwise alter the polarization state 110 of at least a portion of the incident light produced by the polarized light source 105 to provide light having a changed polarization state 135. The polarization state of light passing through the carrier 125 but NOT passing through a polarizing element 130 may be changed to a polarization state 140 that differs in one or more characteristics from (1) light having polarization state 110 that is from the source 105, and (2) light having changed polarization state 135 that is exiting from one of the polarizing elements 125.

The differing changed polarization states 135 and 140 of the light exiting the display 115 may enable the "reading" of the pattern of polarizing elements 130 using a detector 145 that may be capable of distinguishing the changed polarization states 135 and 140. Reading the pattern of polarizing elements may be possible based upon the ability of the detector 145 to discern the changed polarization state 135 of light exiting the polarizing elements 130 from the background changed polarization state 140 of light exiting the carrier 125.

Based upon the unique encoded absolute positional information between the visibly transparent polarizing elements 130, the detector 145 may determine its location on the surface 120 of the display 115. The pattern and relative accuracy of the visibly transparent polarizing elements 130 may contribute to the accuracy of the detector 145 in determining its location with respect to the display 115. A higher accuracy and/or higher density pattern of visibly transparent polarizing elements 130 disposed across the surface 120 of the display 115 may generally improve the accuracy of the location determination by the detector 145. Based upon the unique encoded absolute positional information between the visibly transparent polarizing elements 130, an extremely precise determination of detector 145 location with respect to the pattern of polarizing elements 130 may be possible.

The polarization state 110 may include a plurality of polarization states. However, in some examples, the light may be provided using a polarized light source 105 generating light having ONLY the polarization state 110, e.g. a linear polarized light source producing only one of a vertically polarized light or a horizontally polarized light. In yet other examples, the light may be provided using a non-specific polarized light source 105 generating light having a plurality of polarization states, e.g. a polarized light source 105 producing at least two of vertically, horizontally, or circularly polarized light. The light produced using a non-specific polarized light source 105 may be filtered or similarly adjusted to provide light having only the polarization state 110. The polarized light source 105 can include any number of individual polarized light sources.

The display 115 may have a surface 120 from which light having the polarization state 110 exits or is otherwise emitted. The display 115 may incorporate any technology, for example liquid crystal display (LCD) technology; light emitting diode (LED); organic LED (OLED); active matrix OLED (AMOLED); or any other display technology. Although not depicted as such in FIG. 4, the polarized light source 105 may be incorporated into the display 115, for example the independent LEDs forming an LED display 115 may each be considered a polarized light source 105. Alternately, LCD displays emit linear polarized light via their inherent design.

A carrier 125 having predetermined pattern of visibly transparent polarizing elements 130 disposed therein may be disposed proximate, e.g. applied to, the surface 120 to change or otherwise alter the polarization state 110 to provide (1) light passing through the polarizing element 130 and having a changed polarization state 135, and (2) light passing through the carrier 125 and having changed polarization state 140. The carrier 125 may be any substrate made of a material that does not affect the polarization state of light transiting the carrier. The carrier 126 may be applied to the surface 120 of the display 115 via a bonding agent. The carrier 125 may, for example, be a sticker, panel, glass substrate, or any suitable carrier. However, in other examples, the predetermined pattern of visibly transparent polarizing elements 130 may be applied directly to the surface 120 of the display 115, for example such that the elements 130 are integral on the surface 120. Thus, it is understood herein that when it is stated that the elements 125 are "disposed on" the display 120, this encompasses both (1) examples in which a carrier 125 is used, and (2) examples in which the elements 130 are applied directly on the display. Additionally, to the extent any of the examples are described herein relative to using a carrier 125, it is understood that such examples can also be implemented by directly applying the elements 130. In some examples, an additional carrier, such as a sticker or other carrier, may be applied on area "proximate to the display", that is, to an area of the computing device 150a other than the display 115. For example, the carrier 125 may be applied adjacent to the display 115 and/or around the periphery of the display area on the same side of the computing device 150a on which the display 115 is disposed. The additional carrier may be used for determining to which display a detector is proximate, as will be described relative to FIG. 6.

The polarization state of light passing through each the transparent polarizing elements 130 disposed on the surface 120 of the display 115 may be altered or otherwise changed based upon physical characteristics, composition, or a combination thereof, of the polarizing element 130. Each of the transparent polarizing elements 130 can be composed of a material, for example a polymeric material, capable of transforming or otherwise altering the polarization state of light passing through the polarizing element. For example, linear vertically polarized light generated by a source and passing through a polarizing element 130 may be phase retarded ¼ wave in one direction, for example left or right, while the linear polarized light passing through only the carrier 125 may be phase retarded ¼ wave in the opposite direction. Other changes in polarization state of the light passing through the carrier 125, the polarizing elements 130, or both may be used. Similarly, any polarized light source 105 may be used such that the changed polarization state 135 of the light passing only through the polarizing elements 130 is distinguishable from the changed polarization state 140 of the light passing only through the carrier 125.

An example polymeric material capable of providing the transparent polarizing elements 130 can include, but is not limited to, a photo-aligned, anisotropic optical thin film such as that produced by Rolic® Research Ltd., although other materials and other manufacturers capable of providing similar polarization based filtering capabilities may be substituted. Rolic® provides a curable, liquid, light controlled molecular orientation ("LCMO") polymeric material suitable for photo lithographically producing the polarizing elements 130 within the carrier 125. Through the use of LCMO materials it is possible to create structured optical elements on a microscopic or macroscopic scale using light-induced spatial alignment of molecules within the LCMO material. LCMO aligns molecules, for example the molecules forming the polarizing elements 130, in a predefined way in photo alignment layers by irradiating them with ultra-violet polarized light. Based upon the choice of materials and the direction of incidence and polarization of the light used to form the polarizing elements 130, it is possible for the molecules forming the polarizing elements 130 to be aligned in any direction of the three-dimensional space. An index of refraction birefringence maybe introduced in the material hence producing these polarization altering phase retarding elements.

When disposed upon or formed within a suitable carrier 125, the visibly transparent polarizing elements 130 are not visible to the naked eye when back-illuminated (for example, when back illuminated by the polarized light source 105). The visibly transparent polarizing elements 125 can be deposited on or otherwise formed within the substrate using any method or system, including but not limited to, photolithography and conventional printing technologies.

The polarizing elements 130 can be disposed within the carrier 130 in a unique, specific, spatial or positional pattern. The use of such a pattern creates a geometric relationship between the polarizing elements 130 and their location on the display 115. The geometric relationship between the polarizing elements 130 and the display 115 permit the ability to determine the location of the detector 145 sensitive to the changed polarization state 130 of the light emitted by the polarizing elements 130 when the detector 145 is disposed proximate the display 115.

The pattern of light having the changed polarization state 130 sensed by the detector 145 permits the precise determination of the physical location of the detector 145 on the display 115. Increasing the location accuracy or density of the polarizing elements 130 (for example by forming greater numbers of physically smaller, closer grouped polarizing elements 130) enhances the location detection capability of the detector 145. The size of each of the polarizing elements can vary based on factors such as desired resolution, mastering technique, and the overall size of the display 115 however in general the size of the polarizing elements 130 is on the order of 100 microns and can be as small 15 to 25 microns diameter.

An example pattern capable of providing unique encoded absolute positional information between the visibly transparent polarizing elements 130 is the Anoto dot pattern described above. Disposing the polarizing elements 130 in an Anoto compliant pattern provides a unique location identification system using the detector 145 capable of detecting the changed polarization state 135 of the light passing through the polarizing elements 130. Although the Anoto dot pattern is used as an illustrative example, any comparable predetermined pattern capable of providing unique encoded absolute positional information between the visibly transparent elements 130 may be similarly employed to dispose or locate the elements 130 in, on, or about the carrier 125.

Since changes in the polarization state of light are imperceptible to the human eye, the light emitted by the display 115 may appear uniform across the display regardless of the changed polarization states 135 and 140 of the light. The ability to provide a visually transparent carrier 125 containing visually transparent polarizing elements 130 may enable the use of a detector 145 sensitive to the changed polarization state 135 of the light passing through the polarizing elements 130 to determine the physical location or position of the detector 145 on the display 115 while at the same time providing minimal impairment of the user's view of the display 115. The ability to provide location based data to the detector 145 while simultaneously providing a minimally impaired view of the display 115 to the user provides the display with the ability to contemporaneously function as both an input device, e.g. a device capable of detecting location based input via the detector 145, and an output device, e.g. a display capable of displaying data. An example of the utility of such a device can be found in a display based input tablet. Such a tablet may enable easy, customizable, user configuration of various tiles and input designators on the tablet surface.

The detector 145 may include any device, system, or combination of systems and devices suitable for detecting the changed polarization 135 of the light exiting the polarizing element 130. For example, a detector 145 sensitive to the changed polarization state 135 of the light exiting the polarizing elements 130 may incorporate a circular polarizer analyzer of appropriate handedness and a linear polarizer alignment to discriminate patterns that use ¼ wave polarizing elements 130 of opposite rotational handiness. Other polarization sensitive technologies with similar performance can be used as the basis for the detector 145.

Where the detector 145 is used as an input device to a tablet or where the detector 145 is used similar to a drafting pen, physical displacement of the detector 145 across the surface 120 of the display 115 may affect the scan rate, exposure, and blur reduction capabilities of the detector 145 to properly discern the pattern of polarizing dots 135. A strobed and short duration LED near-IR illuminator in the digital pen 185a may be used to freeze motion and compensate for these motion effects and allow for high rate translation motion of the digital pen 185a. Additional logic may therefore be incorporated into the detector 145 to increase or decrease the detector scan rate based at least in part upon the velocity with which the detector 145 is moved across the surface 120 of the display 115. Similarly, the logic providing for exposure compensation and blur reduction can also be incorporated into the detector 145 based at least in part upon the velocity with which the detector is moved across the surface 120 of the display 115.

The digital pen 185a may include a transmitter 195 to transmit data representing the location of the detector to a computing device. The data representing the location may be the detected pattern.

In some examples, in addition to or as an alternative to the light source 105 inside the computing device 150a and behind the display 115, a light source, such as an IR source, may be provided external to the computing device 150a. The IR source may be provided as part of the digital pen 185a and/or may be attached to the detector 145.

As shown, the digital pen 185a may be communicatively coupled with computing device 150a over connection 170a, and with computing device 150b over connection 170b. The digital pen 185b is communicatively coupled with computing device 150a over connection 170c, and with computing device 150b over connection 170d. Additionally, the computing devices 150a and 150b may be communicatively coupled to each other over connection 170e. The connections 170a-e may be wired or wireless. Wireless communication may be performed by a Bluetooth connection and/or any other radio frequency (RF) transmission, for example.

In some examples, the system 100 may allow various methods to be described herein to be performed with one of the digital pens 185a-b serving as a host device in communication with the computing devices 150a-b, such that the computing devices 150a-b need not be in communication with each other. In other examples, one of the computing devices 150a-b, or another computing device separate from the computing devices 150a-b having displays 115, may serve as a host device in communication with the other computing device and in communication with the digital pens 185a-b.

In some examples, rather than two computing devices 150a-b, there may be three, four, or any greater number of computing devices. Additionally, rather than two digital pens 185a-b, there may be three, four, or any greater number of digital pens.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A digital pen, comprising:
    an internal pen module comprising a cartridge and a pressure sensor;
    a body housing the internal pen module;
    a detector determining a location of the digital pen based on a polarization state of light generated by a source;
    a transmitter transmitting the location of the digital pen to a computing device communicatively coupled to the digital pen; and
    a shuttle connected to the internal pen module on a first end of the digital pen and connected to a twist mechanism on a second end of the digital pen to:
        move only the cartridge and the pressure sensor when the twist mechanism is engaged while retaining length of the digital pen; and
        power the pen responsive to moving the cartridge and the pressure sensor.

2. The digital pen of claim 1, wherein the internal pen module comprises electronic components, infrared LEDs and a camera.

3. The digital pen of claim 1, wherein when the shuttle moves the cartridge and the pressure sensor forward, the cartridge is extended and the digital pen switches to power on mode.

4. The digital pen of claim 3, wherein the shuttle moves the cartridge forward for a distance required to expose tip of the digital pen outside the digital pen.

5. The digital pen of claim 1, wherein when the shuttle moves the cartridge and the pressure sensor backwards, the cartridge is retracted and the digital pen switches to power off mode.

6. The digital pen of claim 5, wherein the shuttle moves the cartridge backwards for a distance required to cover tip of the digital pen inside the digital pen.

7. The digital pen of claim 1, wherein the cartridge is replaceable with other ink cartridges and interchangeable with a plastic stylus to be used on digital surfaces.

8. The digital pen of claim 1, wherein the pressure sensor is a radiofrequency (RF) sensor, an acoustic sensor, a touch sensor, a magnetometer, or a photosensor.

9. A positional input method, comprising:
    generating, using a source, a polarized light at a polarization state to pass through an optical pattern disposed on a display;
    detecting, using a detector, at least a part of the optical pattern, the part of the optical pattern corresponding to a location that is determined based on a change in the polarization state of the polarized light passed through the optical pattern on the display, wherein the detector is located in a digital pen, comprising:
        an internal pen module comprising a cartridge and a pressure sensor; and
        a shuttle connected to the internal pen module on a first end of the digital pen and
    connected to a twist mechanism on a second end of the digital pen to:
        move only the cartridge and the pressure sensor when the twist mechanism is engaged while retaining length of the digital pen; and
        power the pen responsive to moving the cartridge and the pressure sensor.

10. The positional input method of claim 9 wherein the optical pattern is detected by:
    passing the polarized light generated by the source through the optical pattern, the optical pattern being a predetermined pattern of visibly transparent polarizing elements disposed on the display; and
    detecting a change in the polarization state of the polarized light corresponding to the location on the display.

11. A positional input system, comprising:
    a plurality of displays, each of the plurality of displays having disposed thereon a respective predetermined optical pattern;
    a processor to determine to which display of the plurality of displays a detector is proximate;
    a source to generate light to pass through the respective predetermined optical pattern disposed on each of the plurality of displays; and
    a digital pen comprising:
        an internal pen module comprising a cartridge and a pressure sensor; and
        a shuttle connected to the internal pen module on a first end of the digital pen and connected to a twist mechanism on a second end of the digital pen to:
            move only the cartridge and the pressure sensor when the twist mechanism is engaged while retaining length of the digital pen; and
            power the pen responsive to moving the cartridge and the pressure sensor;
        the detector to detect a part of a predetermined optical pattern disposed on a display of the plurality of displays to which the detector is proximate, wherein the part of the predetermined optical pattern corresponds to a location on a surface of the display, and wherein the location is based on a change of a polarization state of the light as the light is passed through the predetermined optical pattern; and
        a transmitter to transmit data representing the location of the digital pen to a computing device communicatively coupled to the digital pen.

12. The positional input system of claim 11, wherein the digital pen comprises a shuttle connected to the internal pen module on a first end of the digital pen and connected to the twist mechanism on a second end of the digital pen.

13. The positional input system of claim 11, wherein the shuttle moves the cartridge and the pressure sensor when the twist mechanism in the pen is engaged.

14. The positional input system of claim 11, wherein the internal pen module stays stable when twist mechanism in the pen is engaged.

* * * * *